(12) United States Patent
Robinson

(10) Patent No.: US 7,696,865 B1
(45) Date of Patent: Apr. 13, 2010

(54) ELECTRONIC MESSAGE BOARD FOR VEHICLES AND ASSOCIATED METHOD

(76) Inventor: Marvin Robinson, 711 Dryden Dr., Baltimore, MD (US) 21229

( * ) Notice: Subject to any disclaimer, the term of this patent is extended or adjusted under 35 U.S.C. 154(b) by 320 days.

(21) Appl. No.: 11/881,711

(22) Filed: Jul. 27, 2007

Related U.S. Application Data

(60) Provisional application No. 60/820,828, filed on Jul. 31, 2006.

(51) Int. Cl.
*B60Q 1/44* (2006.01)

(52) U.S. Cl. ............... 340/479; 40/431; 40/442; 40/541; 40/556; 340/472; 340/473; 340/484; 340/485; 362/459; 362/486; 362/487

(58) Field of Classification Search ......... 340/468–485, 340/425.5; 40/575, 600, 591, 541, 431, 442, 40/556; 362/459–503, 205
See application file for complete search history.

(56) References Cited

U.S. PATENT DOCUMENTS

| | | | |
|---|---|---|---|
| 4,574,269 A | 3/1986 | Miller | |
| 4,631,516 A * | 12/1986 | Clinker | 340/464 |
| 5,339,550 A * | 8/1994 | Hoffman | 40/544 |
| 5,751,212 A | 5/1998 | Findley | |
| 5,838,228 A * | 11/1998 | Clark | 340/436 |
| 5,905,434 A | 5/1999 | Steffan et al. | |
| 5,954,423 A * | 9/1999 | Logan et al. | 362/235 |
| 6,426,696 B1 * | 7/2002 | Ortega | 340/479 |
| 6,789,339 B2 * | 9/2004 | Blease | 40/593 |
| 2004/0145490 A1 * | 7/2004 | Pederson | 340/815.45 |

\* cited by examiner

*Primary Examiner*—Brent Swarthout

(57) ABSTRACT

An electronic message board includes a housing removably affixed to an interior surface of a selected window of a vehicle. Such housing is visible to another driver during driving conditions and includes a back wall with front and rear planar surfaces respectively and a first electrically conductive plate with a planar rear surface directly attached to the front surface of the back wall. The message board further includes a light display removably interfitted within the housing, a light emitting diode array, a transparent faceplate with predetermined indicia formed in a front surface thereof, and a mechanism for selectively actuating the light display.

9 Claims, 5 Drawing Sheets

ELECTRONIC MESSAGE BOARD FOR VEHICLES AND ASSOCIATED METHOD

CROSS REFERENCE TO RELATED APPLICATIONS

This application claims the benefit of U.S. Provisional Application No. 60/820,828, filed Jul. 31, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to message boards and, more particularly, to an electronic message board for vehicles for allowing a driver of an existing vehicle to convey a predetermined visual message to another driver of another existing vehicle during driving conditions.

2. Prior Art

Americans, more than any other nationality, rely on the automobile as the primary means of transportation and our roads and highways are becoming increasingly congested. One of the more disturbing developments that have evolved as a result of the increased traffic and congestion on roads and highways has been a much higher incidence of confrontational incidents, many of a violent nature, between motorists. There have even been a number of random shootings on freeways, evidently spurred on only by the frustration and anger experienced by drivers, manifested by the violent act of willfully committing a very serious crime, a crime which could lead to accidents, injury, or death.

Federal and local authorities are very concerned with the violent trends being exhibited by more and more motorists but are basically at a loss as to what to do to alleviate this situation as the crux of this behavior is directly related to congested traffic conditions and there are no ready solutions which can be implemented in a reasonably short time. Many plans to reduce traffic congestion are being considered but all of these plans will take time, a matter of years, to be developed and implemented. Obviously, it would be advantageous to provide a means for promoting courtesy between drivers and to encourage better cooperation among motorists.

U.S. Pat. No. 4,574,269 to Miller discloses a visual communicator for a rear window of a vehicle. The communicator is semi-transparent and adapted to be disposed in the rear window of the vehicle for viewing from outside of the vehicle. The degree of transparency is such as to accommodate normal use of an inside rearview mirror of the vehicle by a driver of the vehicle. The communicator also includes a message display unit including a plurality of light emitting diodes comprises in a matrix arrangement and disposed in a limited discrete portion of the rear window. The light emitting diodes are selectively energizable to emit light in the form of a message. The communicator further includes a message control unit operationally interconnected to the light emitting diodes for selectively energizing the light emitting diodes. The message control unit is programmed to energize the light emitting diodes in any one of a plurality of preselected patterns. With this arrangement, the preselected patterns form messages for viewing from outside of the vehicle upon selective actuation of the message control unit. Unfortunately, this prior art example is not designed to be displayed with the push of a button.

U.S. Pat. No. 5,751,212 to Findley discloses a signaling device that provides a means for signaling an operator of a vehicle that the lights of that vehicle are distracting and annoying to an operator of another vehicle. The signaling device includes at least one display member having a message, such as "DIM LIGHTS", positioned thereon for conveying the message to the operator of the vehicle. The message may be constructed from a reflective or fluorescent material for enabling the lights of another vehicle to illuminate the message. The signaling device may be stored within the vehicle by attaching the signaling device to a sun visor of the vehicle with a clip. The signaling device may include a plurality of display members for conveying the message and at least one attachment member for attaching together the display members. The signaling device further includes a handle for enabling a person to manipulate the sign. The attachment members and the handle may be constructed of a flexible material for enabling the signaling device to be folded during storage. A fastener may be attached to the display members for securing together the components of the signaling device during storage of the signaling device. Unfortunately, this prior art example is not designed for promoting courtesy among drivers.

U.S. Pat. No. 5,905,434 to Steffan discloses a vehicle communications system having a remote control unit installed in the interior of a vehicle and a display unit located on the exterior of the vehicle. The display unit has an input from the remote control unit and an input from a vehicle interface module that has inputs from the vehicle such as the braking system and the turning signal system. The remote control unit is controllable by the driver in the vehicle and has a table of preset and preprogrammed messages selectable by the driver. The driver selects a message to be displayed and sends the message to the display unit. Any input to the vehicle interface module from the vehicle signaling systems overrides the signal input from the remote control unit unless the display unit is mounted on the front of the vehicle. The driver can select a message from a table of messages that are sequentially displayed on the remote control unit. The table of messages is stored on a flash memory in the remote unit and in a flash memory in the display unit. The table of messages in the remote unit is programmable via a USB programming port. The table of messages in the display unit can be programmed via an RF signal sent to the display unit by the remote unit. Unfortunately, this prior art example is not designed for promoting courtesy among drivers.

Accordingly, the present invention is disclosed in order to overcome the above noted shortcomings. The present invention satisfies such a need by providing a device that is convenient and easy to use, lightweight yet durable in design, and designed for allowing a driver of an existing vehicle to convey a predetermined visual message to another driver of another existing vehicle during driving conditions. The electronic message board provides a unique way to acknowledge the courtesy of another driver by displaying the words "thank you" in the rear window of an automobile. The present invention is simple to use, inexpensive, and designed for many years of repeated use.

BRIEF SUMMARY OF THE INVENTION

In view of the foregoing background, it is therefore an object of the present invention to provide a means for enabling a driver of an existing vehicle to convey a predetermined visual message to another driver of another existing vehicle during driving conditions. These and other objects, features, and advantages of the invention are provided by an electronic message board.

An electronic message board includes a housing removably affixed to an interior surface of a selected window of a vehicle. Such housing is visible to another driver during driving conditions and includes a back wall with front and rear planar surfaces respectively and a first electrically conductive plate with a planar rear surface directly attached to the front surface of the back wall. Such a first conductive plate effectively has a longitudinal length equal to a longitudinal length of the back wall and includes a plurality of electrically conductive detents directly connected to the front surface of the first conductive plate and protruding forwardly into the slot of the housing. The housing further includes a transparent front plate directly connected to a front surface of the first conductive plate along a major portion of an outer perimeter thereof such that a slot is formed between the front plate and the front surface of the first conductive plate. Such a front plate is coextensively shaped with the first conductive plate.

The message board further includes a light display removably interfitted within the housing. Such a light display includes a second electrically conductive plate with front and rear surfaces respectively. Such a second conductive plate conveniently includes a plurality of electrically conductive notches formed in the rear surface of the second conductive plate, and each of the detents of the first conductive plate detachably reside within an associated one of the notches of the second conductive plate when the light display is interfitted within the slot of the housing during operating conditions. The rear surface of the first conductive plate is removably attached directly to the front surface of the first conductive plate.

The light display further includes a light emitting diode array directly and permanently attached to the front surface of the second conductive plate, and the light array is contiguously situated along the front surface of the second conductive plate. A first magnetic frame is directly and permanently attached along the outer perimeter of the front surface of the second conductive plate such that the light array is disposed within the first magnetic frame. Such a magnetic frame advantageously has a centrally registered opening formed therein.

The light display further includes a transparent faceplate with predetermined indicia formed in a front surface thereof and a second magnetic frame directly and permanently attached to a rear surface of the faceplate and along an outer perimeter thereof. Such a second magnetic frame is effectively coextensively shaped with the first magnetic frame. The first magnetic frame and the second magnetic frame are removably mated together, and the light array is intercalated between the second conductive plate and the faceplate when the first and second magnetic frames are mated together. The light display is interfitted within the slot of the housing during operating conditions.

The electronic message board further includes a mechanism for selectively actuating the light display. Such a selective actuating mechanism is conveniently located within an interior of the existing vehicle and in close proximity to the driver during driving conditions. The selective actuating mechanism includes a switch integrally attached to an interior surface of the vehicle and situated in close proximity to the driver of the vehicle. Such a switch is electrically coupled to the vehicle power supply source for selectively energizing the light display. A timer circuit is electrically coupled directly to the switch and the light display respectively.

A method for allowing a driver of an existing vehicle to convey a predetermined visual message to another driver of another existing vehicle during driving conditions includes the steps of: providing a housing; removably affixing the housing to an interior surface of a selected window of the vehicle such that the housing is visible to another driver during driving conditions; interfitting a light emitting diode display within the housing; and selectively actuating the light display between illuminated and non-illuminated modes while the driver is seated within the existing vehicle.

The method further includes the steps of: providing a back wall with planar front and rear surfaces respectively; attaching a rear surface of a first electrically conductive plate directly to the front surface of the back wall; and providing a transparent front plate spaced from a front surface of the first conductive plate such that a slot is formed between the front plate and the front surface of the first conductive plate.

The method further includes the steps of: providing a second electrically conductive plate with front and rear surfaces respectively; attaching a light emitting diode array directly and permanently to the front surface of the second conductive plate; attaching a first magnetic frame directly and permanently along an outer perimeter of the front surface of the second conductive plate such that the light array is disposed within the first magnetic frame; providing a transparent faceplate with predetermined surface indicia thereon; and attaching a second magnetic frame directly and permanently to a rear surface of the faceplate and along an outer perimeter thereof. Such a second magnetic frame is coextensively shaped with the first magnetic frame.

The steps further include removably mating the first magnetic frame and the second magnetic frame directly together. The light array is intercalated between the second conductive plate and the faceplate when the first and second magnetic frames respectively are mated together. The steps further include interfitting the light display within the slot of the housing during operating conditions.

The method further includes the steps of: attaching a switch to an interior surface of the vehicle and in close proximity to the driver of the vehicle, the switch being electrically coupled to the vehicle power supply source; electrically coupling a timer circuit directly to the switch and the light display respectively; and selectively energizing the light display via the switch during driving conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
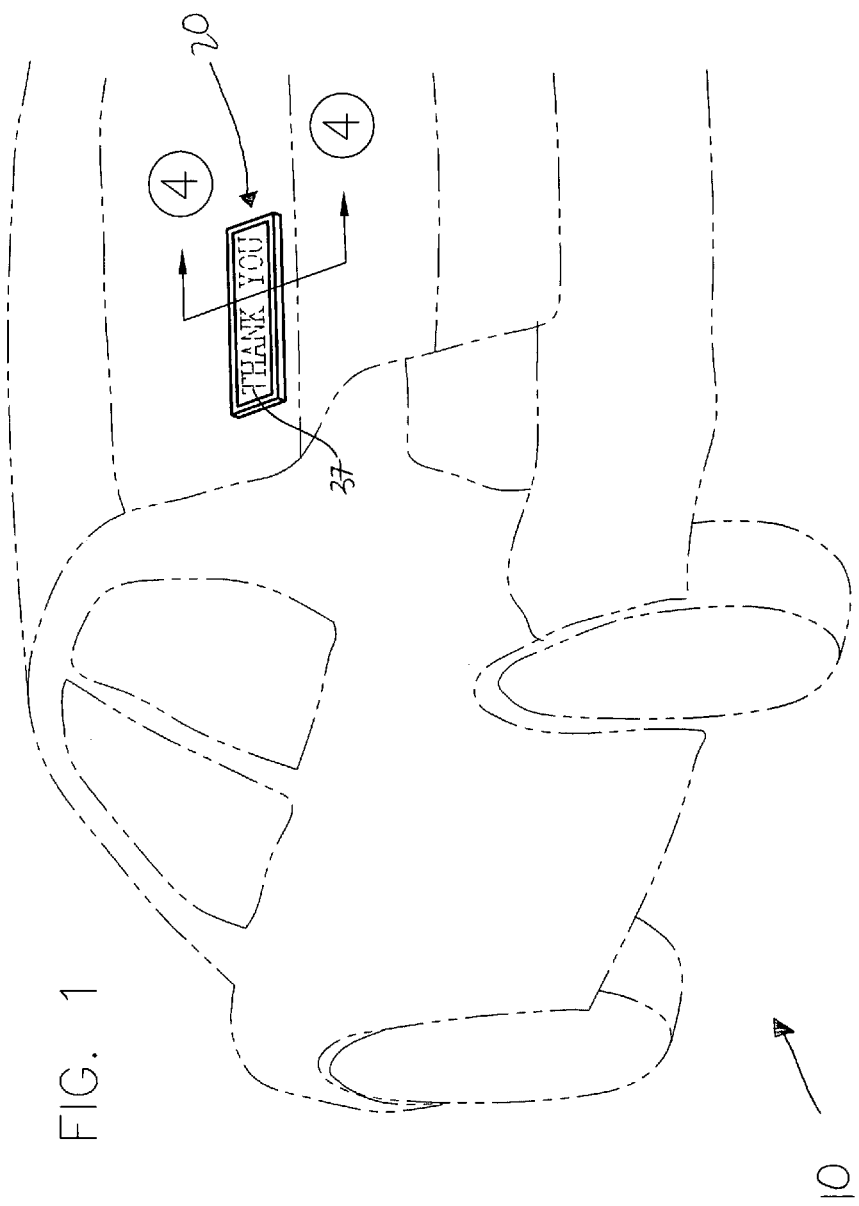
FIG. 1 is a perspective view of an electronic message board displayed in the rear window of a vehicle, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-5 by the reference numeral 10 and is intended to provide a means for allowing a driver of an existing vehicle to convey a predetermined visual message to another driver of another existing vehicle during driving conditions. It should be understood that the device 10 may be used with many different types of vehicles and should not be limited in use with only those types of vehicles mentioned herein.

Figure 4:
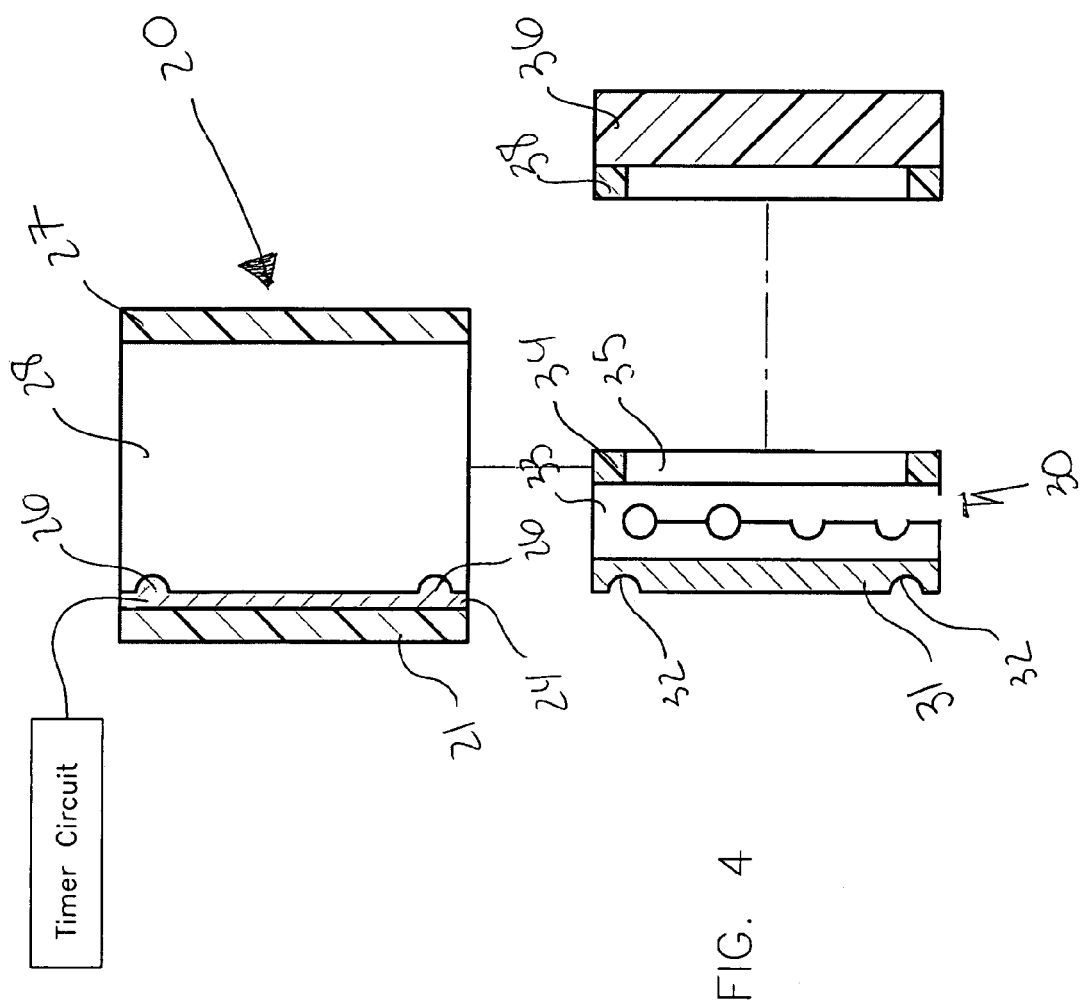
FIG. 4 is a cross sectional view of the housing and light display, taken along line 4-4, as shown in FIG. 1.
Figure 5:
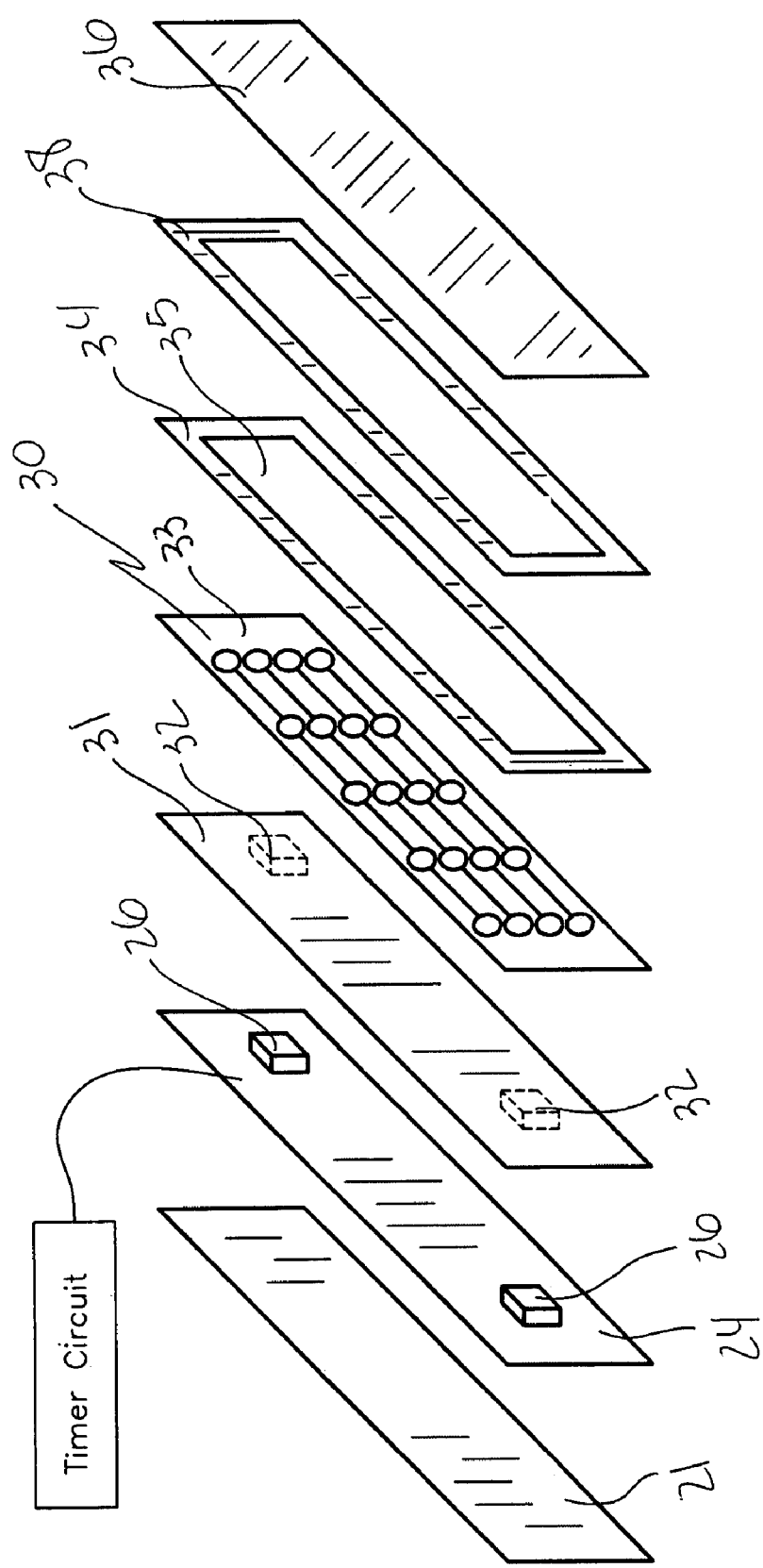
FIG. 5 is a perspective view of the light display, as shown in FIG. 4, in accordance with the present invention.

Referring initially to FIGS. 1, 4 and 5, an electronic message board includes a housing 20 removably affixed to an interior surface of a selected window of a vehicle. Such housing 20 is visible to another driver during driving conditions and includes a back wall 21 with front and rear planar surfaces respectively and a first electrically conductive plate 24 with a planar rear surface directly attached, without the use of intervening characters, to the front surface of the back wall 21. Such a first conductive plate 24 has a longitudinal length equal to a longitudinal length of the back wall 21 and includes a plurality of electrically conductive detents 26 directly connected, without the use of intervening characters, to the front surface of the first conductive plate 24 and protruding forwardly into the slot of the housing. The housing further includes a transparent front plate 27 directly connected, without the use of intervening characters, to a front surface of the first conductive plate 24 along a major portion of an outer perimeter thereof which is essential such that a slot 28 is formed between the front plate 27 and the front surface of the first conductive plate 24. Such a front plate 27 is coextensively shaped with the first conductive plate 24. The housing provides a means for affixing the device to the rear window of a vehicle.

Figure 3:
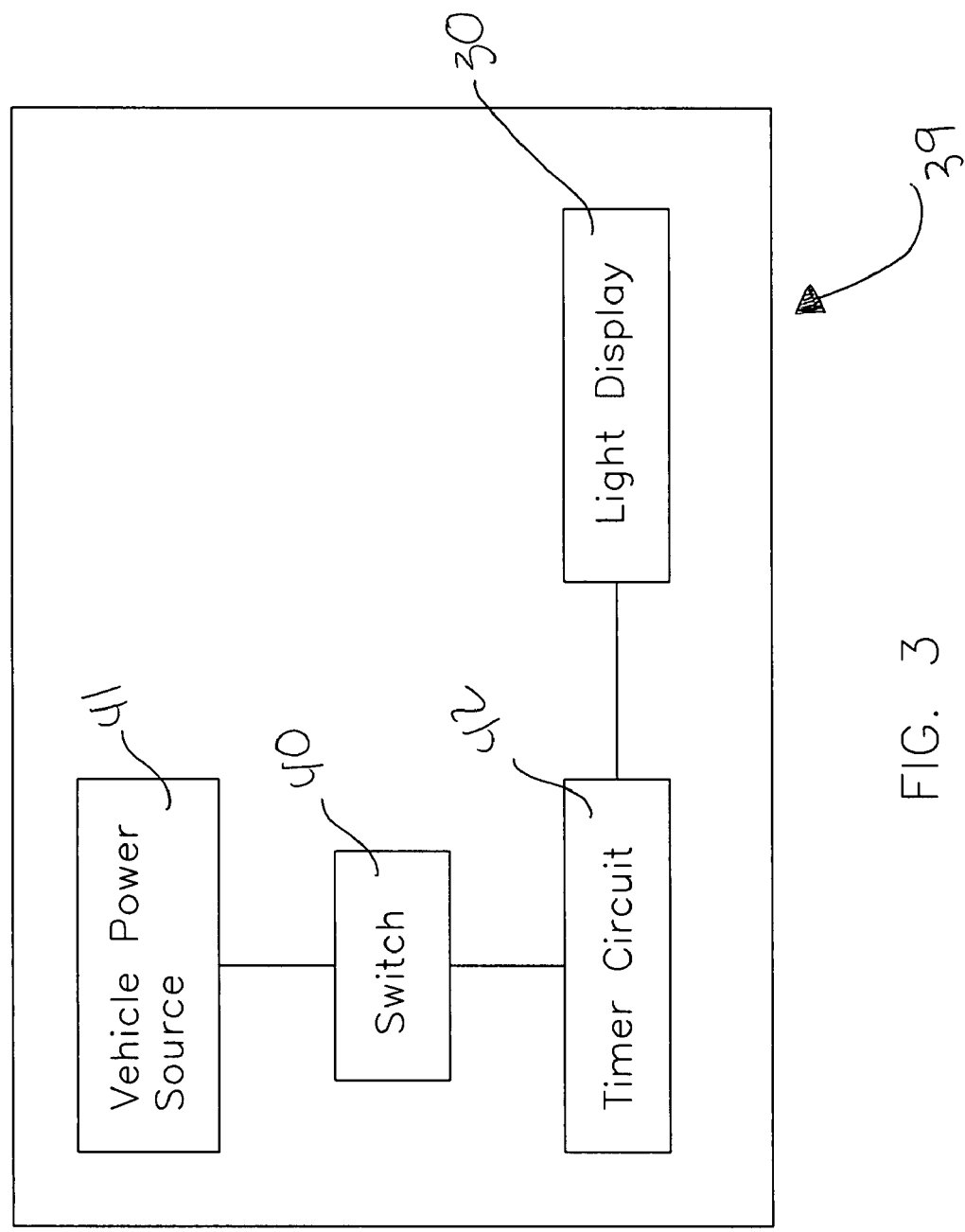
FIG. 3 is a schematic block diagram of the selective actuating mechanism, in accordance with the present invention.

Referring to FIGS. 3, 4 and 5, the message board further includes a light display 30 removably interfitted within the housing 20. Such a light display 30 includes a second electrically conductive plate 31 with front and rear surfaces respectively. Such a second conductive plate 31 includes a plurality of electrically conductive notches 32 formed in the rear surface of the second conductive plate 31, and each of the detents 26 of the first conductive plate 24 detachably reside within an associated one of the notches 32 of the second conductive plate 31 when the light display 30 is interfitted within the slot 28 of the housing 20 during operating conditions. The rear surface of the first conductive plate 24 is removably attached directly, without the use of intervening characters, to the front surface of the first conductive plate 24.

The light display further includes a light emitting diode 33 array directly and permanently, without the use of intervening characters, attached to the front surface of the second conductive plate 31, and the light array 33 is contiguously situated along the front surface of the second conductive plate 31. A first magnetic frame 34 is directly and permanently, without the use of intervening characters, attached along the outer perimeter of the front surface of the second conductive plate 31 which is critical such that the light array 33 is disposed within the first magnetic frame 34. Such a magnetic frame 34 has a centrally registered opening 35 formed therein.

The light display further includes a transparent faceplate 36 with predetermined indicia 37 formed in a front surface thereof and a second magnetic frame 38 directly and permanently, without the use of intervening characters, attached to a rear surface of the faceplate 36 and along an outer perimeter thereof. Such a second magnetic frame 38 is coextensively shaped with the first magnetic frame 34. The first magnetic frame 34 and the second magnetic frame 38 are removably mated together, and the light array 33 is intercalated between the second conductive plate 31 and the faceplate 36 when the first and second magnetic frames 34, 38 are mated together. The light display 30 is interfitted within the slot 28 of the housing 20 during operating conditions. The light display allows the written message to become visible when the light display is activated.

Figure 2:
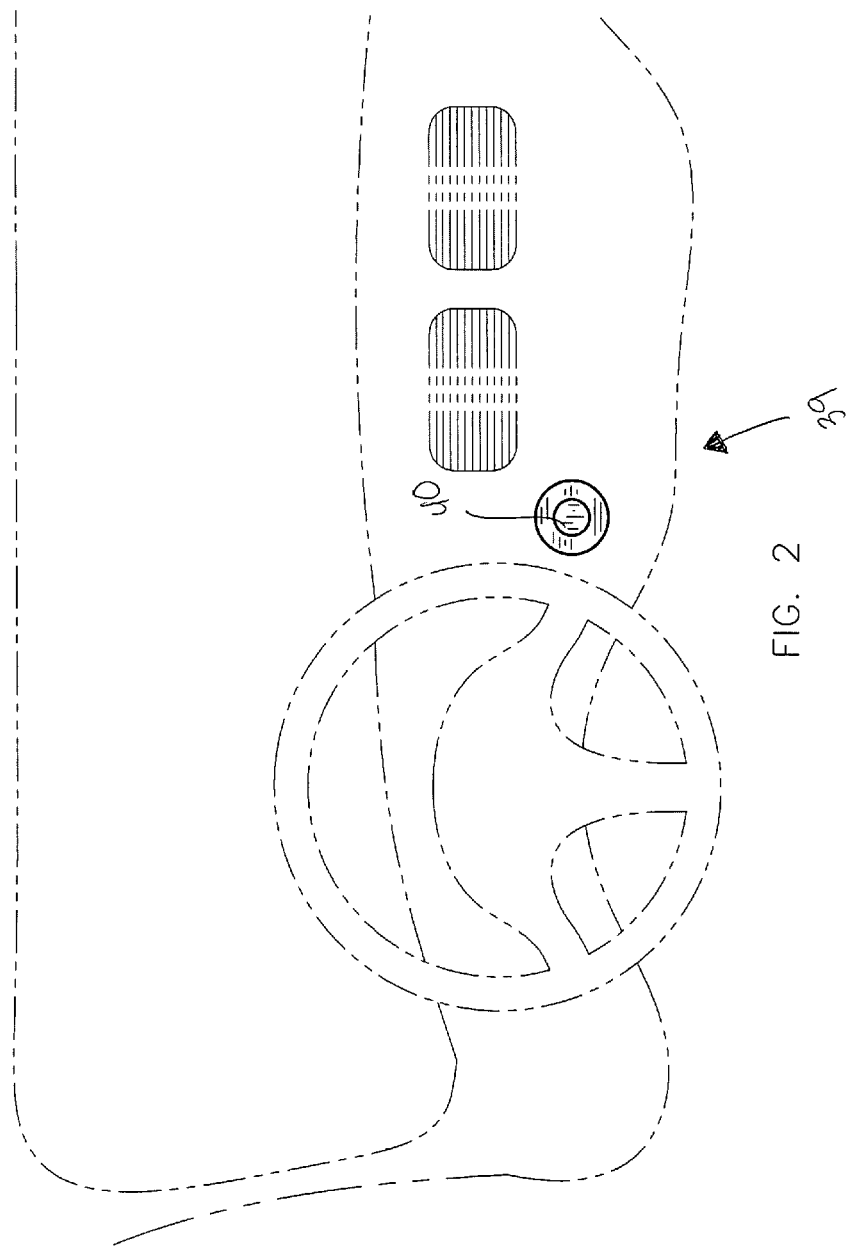
FIG. 2 is a front elevational view of the switch, located on the interior of a vehicle, in accordance with the present invention.

Referring to FIGS. 2 and 3, the electronic message board further includes a mechanism for selectively actuating the light display. Such a selective actuating mechanism 39 is located within an interior of the existing vehicle and in close proximity to the driver during driving conditions. The selective actuating mechanism 39 includes a switch 40 integrally attached to an interior surface of the vehicle and situated in close proximity to the driver of the vehicle. Such a switch 40 is electrically coupled to the vehicle power supply source 41 for selectively energizing the light display 30. A timer circuit 42 is electrically coupled directly, without the use of intervening characters, to the switch 40 and the light display 30 respectively. The selective actuating mechanism controls the light display, thereby activating or deactivating the mechanism displays or retracts the written message as desired by a user.

The selective actuating mechanism provides the unexpected benefit of allowing a user to control the display message. In addition, the light display may be adjusted in order to display different colors and/or intensities of light. Also, the transparent faceplate may advantageously be replaced in order to display different messages. Such benefits overcome the prior art shortcomings.

In use, a method for allowing a driver of an existing vehicle to convey a predetermined visual message to another driver of another existing vehicle during driving conditions includes the steps of: providing a housing 20; removably affixing the housing 20 to an interior surface of a selected window of the vehicle such that the housing 20 is visible to another driver during driving conditions; interfitting a light emitting diode display 30 within the housing 20; and selectively actuating the light display 20 between illuminated and non-illuminated modes while the driver is seated within the existing vehicle.

In use, the method further includes the steps of: providing a back wall 21 with planar front and rear surfaces respectively; attaching a rear surface of a first electrically conductive plate 24 directly, without the use of intervening characters, to the front surface of the back wall 21; and providing a transparent front plate 27 spaced from a front surface of the first conductive plate 24 such that a slot 28 is formed between the front plate 27 and the front surface of the first conductive plate 24.

In use, the method further includes the steps of: providing a second electrically conductive plate 31 with front and rear surfaces respectively; attaching a light emitting diode array 33 directly and permanently, without the use of intervening characters, to the front surface of the second conductive plate 31; attaching a first magnetic frame 34 directly and permanently, without the use of intervening characters, along an outer perimeter of the front surface of the second conductive plate 31 such that the light array 33 is disposed within the first magnetic frame 34; providing a transparent faceplate 36 with predetermined surface indicia thereon; and attaching a second magnetic frame 38 directly and permanently, without the use of intervening characters, to a rear surface of the faceplate 36 and along an outer perimeter thereof. Such a second magnetic frame 38 is coextensively shaped with the first magnetic frame 34.

The steps further include removably mating the first magnetic frame 34 and the second magnetic frame 38 directly together. The light array 33 is intercalated between the second conductive plate 31 and the faceplate 36 when the first and second magnetic frames 34, 38 respectively are mated together. The steps further include interfitting the light display 30 within the slot 28 of the housing 20 during operating conditions.

In use, the method further includes the steps of: attaching a switch 40 to an interior surface of the vehicle and in close proximity to the driver of the vehicle, the switch 40 being electrically coupled to the vehicle power supply source 41; electrically coupling a timer circuit 42 directly to the switch 40 and the light display 30 respectively; and selectively energizing the light display 30 via the switch during driving conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. An electronic message board for enabling a driver of an existing vehicle to convey a predetermined visual message to another driver of another existing vehicle during driving conditions, said electronic message board comprising:

a housing removably affixed to an interior surface of a selected window of the vehicle;

a light display removably interfitted within said housing; and means for selectively actuating said light display, said selective actuating means being located within an interior of the existing vehicle and in close proximity to the driver during driving conditions;

wherein said housing comprises:

a back wall having front and rear planar surfaces respectively;

a first electrically conductive plate having a planar rear surface directly attached to said front surface of said back wall, said first conductive plate having a longitudinal length equal to a longitudinal length of said back wall; and a transparent front plate directly connected to a front surface of said first conductive plate along a major portion of an outer perimeter thereof such that a slot is formed between said front plate and said front surface of said first conductive plate, said front plate being coextensively shaped with said first conductive plate;

wherein said first conductive plate comprises a plurality of electrically conductive detents directly connected to said front surface of said first conductive plate and protruding forwardly into said slot of said housing;

a second electrically conductive plate having front and rear surfaces respectively, said rear surface of said first conductive plate being removably attached directly to said front surface of said first conductive plate;

a light emitting diode array directly and permanently attached to said front surface of said second conductive plate, said light array being contiguously situated along said front surface of said second conductive plate;

a first magnetic frame directly and permanently attached along said outer perimeter of said front surface of said second conductive plate such that said light array is disposed within said first magnetic frame, said magnetic frame having a centrally registered opening formed therein;

a transparent faceplate having predetermined indicia formed in a front surface thereof; and a second magnetic frame directly and permanently attached to a rear surface of said faceplate and along an outer perimeter thereof, said second magnetic frame being coextensively shaped with said first magnetic frame;

wherein said first magnetic frame and said second magnetic frame are removably mated together, said light array being intercalated between said second conductive plate and said faceplate when said first and second magnetic frames are mated together;

wherein said light display is interfitted within said slot of said housing during operating conditions.

2. The electronic message board of claim 1, wherein said second conductive plate comprises:

a plurality of electrically conductive notches formed in said rear surface of said second conductive plate, each of said detents of said first conductive plate detachably residing within an associated one of said notches of said second conductive plate when said light display is interfitted within said slot of said housing during operating conditions.

3. The electronic message board of claim 2, wherein said selective actuating means comprises:
a switch integrally attached to an interior surface of the vehicle and situated in close proximity to the driver of the vehicle, said switch being electrically coupled to the vehicle power supply source for selectively energizing said light display; and
a timer circuit electrically coupled directly to said switch and said light display respectively.

4. An electronic message board for enabling a driver of an existing vehicle to convey a predetermined visual message to another driver of another existing vehicle during driving conditions, said electronic message board comprising:
a housing removably affixed to an interior surface of a selected window of the vehicle, said housing being positioned adjacent to a window of the vehicle such that said housing is visible to another driver during driving conditions;
a light display removably interfitted within said housing; and
means for selectively actuating said light display, said selective actuating means being located within an interior of the existing vehicle and in close proximity to the driver during driving conditions;
wherein said housing comprises
a back wall having front and rear planar surfaces respectively;
a first electrically conductive plate having a planar rear surface directly attached to said front surface of said back wall, said first conductive plate having a longitudinal length equal to a longitudinal length of said back wall; and
a transparent front plate directly connected to a front surface of said first conductive plate along a major portion of an outer perimeter thereof such that a slot is formed between said front plate and said front surface of said first conductive plate, said front plate being coextensively shaped with said first conductive plate;
wherein said first conductive plate comprises:
a plurality of electrically conductive detents directly connected to said front surface of said first conductive plate and protruding forwardly into said slot of said housing;
a second electrically conductive plate having front and rear surfaces respectively, said rear surface of said first conductive plate being removably attached directly to said front surface of said first conductive plate;
a light emitting diode array directly and permanently attached to said front surface of said second conductive plate, said light array being contiguously situated along said front surface of said second conductive plate;
a first magnetic frame directly and permanently attached along said outer perimeter of said front surface of said second conductive plate such that said light array is disposed within said first magnetic frame, said magnetic frame having a centrally registered opening formed therein;
a transparent faceplate having predetermined indicia formed in a front surface thereof; and
a second magnetic frame directly and permanently attached to a rear surface of said faceplate and along an outer perimeter thereof, said second magnetic frame being coextensively shaped with said first magnetic frame;
wherein said first magnetic frame and said second magnetic frame are removably mated together, said light array being intercalated between said second conductive plate and said faceplate when said first and second magnetic frames are mated together;
wherein said light display is interfitted within said slot of said housing during operating conditions.

5. The electronic message board of claim 4, wherein said second conductive plate comprises:
a plurality of electrically conductive notches formed in said rear surface of said second conductive plate, each of said detents of said first conductive plate detachably residing within an associated one of said notches of said second conductive plate when said light display is interfitted within said slot of said housing during operating conditions.

6. The electronic message board of claim 5, wherein said selective actuating means comprises:
a switch integrally attached to an interior surface of the vehicle and situated in close proximity to the driver of the vehicle, said switch being electrically coupled to the vehicle power supply source for selectively energizing said light display; and
a timer circuit electrically coupled directly to said switch and said light display respectively.

7. A method for allowing a driver of an existing vehicle to convey a predetermined visual message to another driver of another existing vehicle during driving conditions, said method comprising the steps of:
a. providing a housing;
b. removably affixing said housing to an interior surface of a selected window of the vehicle such that said housing is visible to another driver during driving conditions;
c. interfitting a light emitting diode display within said housing; and
d. selectively actuating said light display between illuminated and non-illuminated modes while the driver is seated within the existing vehicle;
wherein step a. comprises the steps of:
i. providing a back wall having planar front and rear surfaces respectively;
ii. attaching a rear surface of a first electrically conductive plate directly to said front surface of said back wall; and
iii. providing a transparent front plate spaced from a front surface of said first conductive plate such that a slot is formed between said front plate and said front surface of said first conductive plate;
wherein said first conductive plate comprises
a plurality of electrically conductive detents directly connected to said front surface of said first conductive plate, said detents extending forwardly into said slot of said housing;
wherein step c. comprises the steps of:
iv. providing a second electrically conductive plate having front and rear surfaces respectively;
v. attaching a light emitting diode array directly and permanently to said front surface of said second conductive plate;
vi. attaching a first magnetic frame directly and permanently along an outer perimeter of said front surface of said second conductive plate such that said light array is disposed within said first magnetic frame;

vii. providing a transparent faceplate having predetermined surface indicia thereon;
viii. attaching a second magnetic frame directly and permanently to a rear surface of said faceplate and along an outer perimeter thereof, said second magnetic frame being coextensively shaped with said first magnetic frame;
ix. removably mating said first magnetic frame and said second magnetic frame directly together, said light array being intercalated between said second conductive plate and said faceplate when said first and second magnetic frames respectively are mated together; and
x. interfitting said light display within said slot of said housing during operating conditions.

8. The method of claim 7, wherein said second conductive plate comprises:
a plurality of electrically conductive notches formed in said rear surface of said second conductive plate, each of said detents of said first conductive plate detachably residing within an associated one of said notches of said second conductive plate when said light display is interfitted within said slot of said housing during operating conditions.

9. The method of claim 8, wherein step d. comprises the steps of:
i. attaching a switch to an interior surface of the vehicle and in close proximity to the driver of the vehicle, said switch being electrically coupled to the vehicle power supply source;
ii. electrically coupling a timer circuit directly to said switch and said light display respectively; and
iii. selectively energizing said light display via said switch during driving conditions.

* * * * *